US008078651B2

United States Patent
Desai et al.

(10) Patent No.: US 8,078,651 B2
(45) Date of Patent: Dec. 13, 2011

(54) MATCH RULES TO IDENTIFY DUPLICATE RECORDS IN INBOUND DATA

(75) Inventors: Kunal Desai, Foster City, CA (US); Deena Philip, Belmont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 343 days.

(21) Appl. No.: 12/257,269

(22) Filed: Oct. 23, 2008

(65) Prior Publication Data

US 2009/0193046 A1    Jul. 30, 2009

Related U.S. Application Data

(60) Provisional application No. 61/023,184, filed on Jan. 24, 2008.

(51) Int. Cl.
*G06F 7/00*    (2006.01)
(52) U.S. Cl. ....................................... 707/812
(58) Field of Classification Search .................. 707/609, 707/665, 802, 812
See application file for complete search history.

(56) References Cited

U.S. PATENT DOCUMENTS

| | | | |
|---|---|---|---|
| 7,340,491 B2 * | 3/2008 | Campbell | 707/694 |
| 2004/0117619 A1 * | 6/2004 | Singer et al. | 713/156 |
| 2005/0076070 A1 * | 4/2005 | Mikami | 707/204 |
| 2005/0225778 A1 * | 10/2005 | Izumi | 358/1.1 |
| 2005/0226059 A1 * | 10/2005 | Kavuri et al. | 365/189.05 |
| 2007/0266174 A1 * | 11/2007 | Bestler | 709/238 |
| 2009/0037488 A1 * | 2/2009 | Abrams | 707/201 |
| 2010/0088392 A1 * | 4/2010 | Kuhl et al. | 709/217 |

* cited by examiner

*Primary Examiner* — Angela Lie
(74) *Attorney, Agent, or Firm* — Kilpatrick Townsend & Stockton LLP

(57) ABSTRACT

Techniques for identifying duplicate records in data to be imported into a data hub. In one set of embodiments, a batch of records to be imported into a data hub is received and a match rule for the batch of records is selected. The match rule includes a set of match criteria for matching records in the inbound batch to records stored in the data hub. A matching process is then carried out, prior to importing the batch of records, to determine whether any of the records in the batch are duplicates of records stored in the data hub. By identifying potential duplicate records before (rather than after) importation, the problems associated with prior art duplicate identification techniques are minimized or avoided. In a particular embodiment, an import workbench application comprising a plurality of user interface screens is provided for aiding a user in managing the matching process.

24 Claims, 12 Drawing Sheets

MATCH RULES TO IDENTIFY DUPLICATE RECORDS IN INBOUND DATA

CROSS-REFERENCES TO RELATED APPLICATIONS

The present application claims the benefit and priority under 35 U.S.C. 119(e) of U.S. Provisional Application No. 61/023,184, filed Jan. 24, 2008, entitled "MATCH RULES TO IDENTIFY DUPLICATE RECORDS IN INBOUND DATA," the entire contents of which are incorporated herein by reference for all purposes.

BACKGROUND OF THE INVENTION

Embodiments of the present invention relate to information management, and more particularly relate to techniques for identifying duplicate records in data imported into a data repository, such as a data hub.

A data hub, or master data management (MDM) solution, is a collection of software and/or hardware components that enables a business to maintain a single, master source of information that is accessible across multiple, heterogeneous information management systems. Currently, software vendors offer a variety of different types of data hubs directed to different business areas or industries. For example, the Product Information Management Data Hub (PIMDH) developed by Oracle Corporation provides product development/manufacturing organizations a centralized view of their product-related data.

Since a data hub acts as a centralized, authoritative source of information, an important aspect of managing a data hub is maintaining the quality of the data stored therein. Accordingly, any data that is imported into a data hub should be appropriately "cleansed" so that it is valid, consistent, and accurate. Merely by way of example, consider a product management data hub (such as PIMDH) that is configured to store records for a plurality of different products/items. In some cases, records may be imported into the data hub (from, for instance, legacy and/or third-party systems) that duplicate some portion of the data already present in the hub. This results in duplicate or overlapping records per item. To maintain the consistency of the data stored in the hub, these duplicate records should be merged into a single, master record per item.

In current practice, the problem of duplicate records described above is generally managed in an ex post fashion. In other words, records from external systems are initially imported into the data hub, without regard to the existence of duplicate records in the hub. Once the records have been imported, the data hub is manually searched to identify potential duplicates. The potential duplicates are then exported from the data hub, manually merged, and then re-imported into the data hub as merged data.

However, this expost approach is problematic for several reasons. For example, the process of importing records, exporting potential duplicates, and then re-importing the merged data is inefficient and potentially very time-consuming. This will be particularly true if the number of records being imported (i.e., the size of the import batch) is large. Further, since uncleansed (e.g., duplicate-containing) data is initially imported into the production environment of the data hub, the users of the production environment (e.g., internal users, external partners, etc.) will see an inconsistent view of the data until the duplicates are removed/merged. This problem can be mitigated by bringing down the production environment while the imported records are searched, exported, merged, and re-imported. However, this obviously increases the downtime of the data hub during the import process. If records are imported on a regular basis, this increased downtime may by unacceptable.

BRIEF SUMMARY OF THE INVENTION

Embodiments of the present invention address the foregoing and other such problems by providing techniques for identifying duplicate records in data to be imported into a data repository, such as a data hub. In one set of embodiments, a batch of records to be imported into a data hub is received and a match rule for the batch of records is selected. The match rule includes a set of match criteria for matching records in the inbound batch to records stored in the data hub. A matching process is then carried out, prior to importing the batch of records, to determine whether any of the records in the batch are duplicates of records stored in the data hub. By identifying potential duplicate records before (rather than after) importation, the problems associated with prior art duplicate identification techniques are minimized or avoided. In a particular embodiment, an import workbench application comprising a plurality of user interface screens is provided for aiding a user in managing the matching process.

According to one embodiment of the present invention, a method for identifying duplicate records in inbound data comprises receiving data originating from a source system, the data including a plurality of records to be imported from the source system into a data hub, and selecting a first match rule. The first match rule includes a first set of match criteria identifying one or more attributes of the plurality of records and one or more match operators for matching the plurality of records with records stored in the data hub. The method further comprises determining, based on the first match rule, a first set of records in the plurality of records that match records stored in the data hub. In various embodiments, the determining is performed prior to importing any of the plurality of records into the data hub.

In one embodiment, the first set of records is presented to a user for review. The user may then select one or more records and thereby carry out various operations with respect to the selected records. For example, the user may select a particular record for importation into the data hub. Typically, this will comprise merging the selected record with one or more matching records in the data hub. The user may also select a particular record so that it is discarded (i.e., not imported).

In another embodiment, the first set of records may be automatically imported into the data hub.

In one embodiment, the first set of records is presented to a user for a review, and a selection of a second match rule is received from the user. The second match rule comprises a second set of match criteria that is different from the first set of match criteria. A second set of records that match records stored in the data hub is then determined based on the second match rule. In various embodiments, this determining is also performed prior to importing any of the plurality of records into the data hub.

Once the second set of records is determined, the second set may be presented to a user in a manner similar to the first set. The user may then select one or more records in the second set and thereby carry out various operations with respect to the selected records. In a particular embodiment, the user may iteratively select and execute different match rules against the plurality of records (or selected records in the plurality) until the user is satisfied with the results.

In one embodiment, the first match rule is selected based on the plurality of records, the source system, or a category associated with the plurality of records.

In one embodiment, the one or more attributes of the plurality of records include user-defined attributes.

In one embodiment, the one or more match operators include a fuzzy match operator, a stemming match operator, and a synonym match operator.

In one embodiment, the step of determining the first set of records is performed as a concurrent request process.

According to another embodiment of the present invention, a method for identifying duplicate records in inbound data comprises receiving data originating from a source system, where the data includes a plurality of records to be imported from the source system into a data hub. The method further comprises, for each record in the plurality of records, selecting a match rule comprising a set of match criteria, where the match rule is selected based on a category associated with the record, and where the set of match criteria identifies one or more attributes of the record and one or more match operators for matching the record with records stored in the data hub; and determining, based on the match rule, whether the record matches any records stored in the data hub. In various embodiments, the determining is performed for each record in the plurality of records prior to importing any of the plurality of records into the data hub.

According to another embodiment of the present invention, a system for identifying duplicate records in inbound data is provided. The system comprises a data repository configured to store a plurality of match rules, and a server communicatively coupled with the data repository. The server is configured to receive data originating from a source system, the data including a plurality of records to be imported from the source system into a data hub, and select a first match rule. The first match rule includes a first set of match criteria identifying one or more attributes of the plurality of records and one or more match operators for matching the plurality of records with records stored in the data hub. The server is further configured to determine, based on the first match rule, a first set of records in the plurality of records that match records stored in the data hub. In various embodiments, the determining is performed prior to importing any of the plurality of records into the data hub.

In one embodiment, the server is configured to generate a user interface presenting the first set of records to a user; receive, from the user, a selection of at least one record in the first set of records; and import said at least one record into the data hub, where the importing comprises merging said at least one record with a matching record stored in the data hub. In another embodiment, the server is configured to automatically import the first set of records.

In one embodiment, the server is configured to generate a user interface presenting the first set of records to a user; receive, from the user, a selection of a second match rule comprising a second set of match criteria, the second set of match criteria being distinct from the first set of match criteria; and determine, based on the second match rule, a second set of records in the plurality of records that match records stored in the data hub. In various embodiments, the determining is performed prior to importing any of the plurality of records into the data hub.

In one embodiment, the server is further configured to generate a user interface screen for defining the plurality of match rules. For example, the user interface screen may include one or more user interface components for defining match criteria for a match rule. The user interface screen may also include one or more user interface components for defining attributes for a match rule.

According to another embodiment of the present invention, a machine-readable medium for a computer system is provided. The machine-readable medium has stored thereon program code for identifying duplicate records in inbound data, the program code comprising code for receiving data originating from a source system, the data including a plurality of records to be imported from the source system into a data hub, and code for selecting a first match rule. The first match rule includes a first set of match criteria identifying one or more attributes of the plurality of records and one or more match operators for matching the plurality of records with records stored in the data hub. The program code further comprises code for determining, based on the first match rule, a first set of records in the plurality of records that match records stored in the data hub. In various embodiments, the determining is performed prior to importing any of the plurality of records into the data hub.

In one embodiment, the program code comprises code for presenting the first set of records to a user; code for receiving, from the user, a selection of at least one record in the first set of records; and code for importing said at least one record into the data hub, where the importing comprises merging said at least one record with a matching record stored in the data hub. In another embodiment, the program code comprises code for automatically importing the first set of records into the data hub.

In one embodiment, the program code comprises code for presenting the first set of records to a user; code for receiving, from the user, a selection of a second match rule comprising a second set of match criteria, the second set of match criteria being distinct from the first set of match criteria; and code for determining, based on the second match rule, a second set of records in the plurality of records that match records stored in the data hub. In various embodiments, the determining is performed prior to importing any of the plurality of records into the data hub.

The foregoing, together with other features, embodiments, and advantages of the present invention, will become more apparent when referring to the following specification, claims, and accompanying drawings.

BRIEF DESCRIPTION OF THE DRAWINGS

FIGS. 4-7 are user interface screens of an import workbench application in accordance with an embodiment of the present invention.

DETAILED DESCRIPTION OF THE INVENTION

Figure 1A:
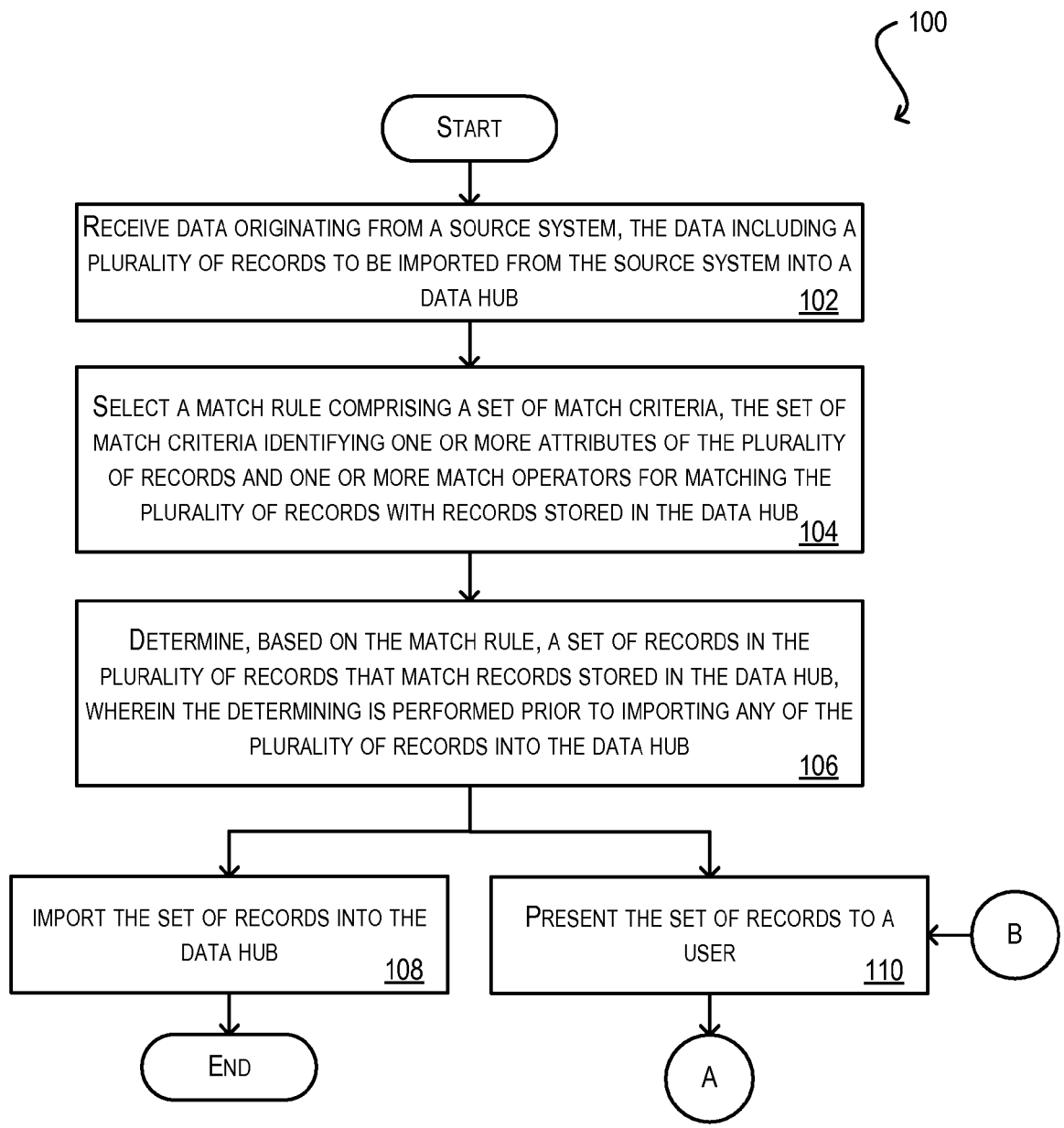
FIGS. 1A-1D are flowcharts illustrating steps performed in identifying duplicate records in inbound data in accordance with an embodiment of the present invention.

In the following description, for the purposes of explanation, numerous specific details are set forth in order to provide an understanding of the present invention. It will be apparent, however, to one skilled in the art that the present invention may be practiced without some of these specific details.

Embodiments of the present invention provide techniques for identifying duplicate records in inbound data (e.g., data to be imported into, for example, a data hub). According to one set of embodiments, a batch of inbound records originating from a source system is received, and a match rule for the inbound records is selected. The match rule may be selected based on the source system, a category associated with records in the batch, or the batch itself. In various embodiments, the match rule comprises one or more match criteria for identifying records in the inbound batch that match records stored in a destination data hub.

Once the match rule is selected, the match rule is executed to determine whether any of the records in the inbound batch are duplicates of records stored in the data hub. Significantly, this matching process is performed prior to importing any of the records in the data hub, thereby avoid the inefficiencies associated with performing matching and duplicate removal after import. In one set of embodiments, the matching process comprises identifying records in the batch that match one or more match criteria in the match rule. The same match criteria are applied to records stored in the data hub to identify potential duplicates. Any duplicates identified are then marked as "unconfirmed" duplicates.

In one set of embodiments, the unconfirmed duplicates are presented to a user of the data hub (e.g., an administrator) to determine how the unconfirmed duplicates should be processed. For example, a user may review unconfirmed duplicate records corresponding to a given item and determine that the records should be imported the data hub. The duplicates would then be merged and imported. Alternatively, the user may determine that one or more of the unconfirmed duplicates should be discarded. In another example, the unconfirmed duplicates may be automatically merged and imported into the data hub, without any human intervention.

The matching process described above may be executed on all of the inbound records in the batch, or on a single record. In addition, the process may be subject to one or more configurable rules (separate from the match rule). For example, if an inbound record has a particular cross-reference or is marked as a "new" record, it may be excluded from duplicate identification. Further, the inbound records may be classified into one or more categories, which are then used to apply match rules to the records as defined for their respective categories.

In certain embodiments, the matching process may be iterated multiple times for a single batch. For example, a first match rule may be applied to the batch, and an initial list of unconfirmed duplicates may be identified. A user may then review the list of unconfirmed duplicates and determine that a different match rule would likely be more appropriate. As a result, the user may then re-execute the matching process using a second match rule different from the first. This process may be iterated multiple times until the user is satisfied with the resultant matches. In various embodiments, the user may specify that the entire batch be re-matched, or than only specific records in the batch be re-matched.

In one set of embodiments, the processes described above are performed by the data hub. In an alternative set of embodiments, these processes are performed by a software and/or hardware component that is separate from, but in communication with, the data hub. In a particular embodiment, an "import workbench" application is provided. The import workbench application comprises a plurality user interface screens for performing tasks related to matching duplicate records and importing data into a data hub.

FIG. 1A is a flowchart 100 illustrating steps performed in identifying duplicate records in inbound data according to an embodiment of the present invention. In various embodiments, the processing of flowchart 100 may be implemented in software, hardware, or combinations thereof. In one set of embodiments, the processing of flowchart 100 is implemented as a software module within a data hub.

At step 102, data originating from a source system is received, the data including a plurality (e.g., batch) of records to be imported from the source system into a data hub. For example, the source system may be a legacy and/or third-party system/application, and the plurality of records may be designated for import in order to consolidate the data from the source system into the data hub. In one set of embodiments, the plurality of records may be received directly from the source system, such as via a network link between the source system and the data hub. In other embodiments, the plurality of records may be encapsulated in a data file (e.g., XML file, Excel spreadsheet, CSV file, etc.) that is uploaded from a client machine to the data hub.

Once the plurality of records is received, a match rule is selected for the plurality of records (step 104). The match rule comprises one or more match criteria that are used to match records in the inbound batch with records stored in the data hub. In one set of embodiments, each match criterion identifies an attribute of the plurality of records and one or more match operators. For example, if the inbound records include the attributes ItemName, ItemType, and Description, one match criterion may identify the attribute ItemName and the match operator "Exact." In this case, any record in the inbound batch having the exact same value in the ItemName attribute as a record stored in the data hub will be considered a duplicate record. In a specific embodiment, the attributes identified by match criteria can include user-defined attributes.

In one set of embodiments, a plurality of match rules may be associated (at various levels) with the inbound batch. For example, one match rule may be associated with the source system originating the batch, another match rule may be associated with one or more categories of records in the batch, and yet another match rule may be associated with the batch itself. In these cases, selecting the match rule at step 104 comprises applying a set of precedence rules to determine which match rule is most appropriate. One such set of precedence rules is described with respect to FIG. 2 below.

Generally speaking, match rules that are associated at the category level are considered category-specific match rules. These category-specific match rules may include match criteria that identify category-specific attributes. For example, consider an inbound record for a computer assembly that is under the category "Motherboard." A match rule associated with the category "Motherboard" may include match criteria that identify attributes specific to motherboards, such as "Chipset." In various embodiments, the categories for records/items may be organized into a category hierarchy. Thus, a match rule associated with a parent category may be inherited by a child category. Further, a particular match rule may be defined as an overall default for a category hierarchy.

Match rules that are associated at the source system or batch level are considered generic match rules. These generic match rules only include match criteria that identify non-category-specific attributes.

As described above, each match criterion identifies an attribute and one or more match operators. These match operators determine how attribute values in the inbound records are matched to attribute values in the records stored in the data hub. In one set of embodiments, the match operators that can be included in a match criterion will vary depending on the data type of the attribute. For example, a numeric attribute may allow for operators such as "equals," "greater than," or "less than." On the other hand, a text attribute may allow for a different set of operators, such as "exact" (indicating that a match must include all words in the attribute) or "any" (indicating that a match can include any word in the attribute).

In a particular embodiment, certain attributes (e.g., text-based attributes) may be matched using a text index, such as Oracle Text Index. This can be enabled by including a "keyword" operator in the match criterion. When the "keyword" operator is set, additional operators can be selected to apply different types of text index search logic. For example, the following additional operators can be selected:

Fuzzy match operator
Stemming match operator
Synonym match operator

In one embodiment, a score is generated for matches made using the text index. All attributes in a match rule that do not use a text index may be considered a 100% match.

At step 106, a matching process is initiated based on the match rule selected at step 104 to determine a set of records in the plurality of records that match records stored in the data hub. This process typically comprises applying the match criteria in the selected match rule to both (1) the records in the inbound batch and (2) the records stored in the data hub. If a record from group (1) and a record from group (2) satisfy the same match criterion, they are considered potential duplicates of each other. These are generally marked as "unconfirmed" duplicates.

The manner in which records are marked via the matching process varies depending on how many matches per record are identified. For example, in a specific embodiment, if multiple matches are found for an inbound record, the record is marked as "unconfirmed" and "multiple." For a batch level match, if a single matching record is found, a matching option "Automatically Confirm Single Matches" determines whether the record is given an "unconfirmed" or "confirmed" record status. If no matches are found, the inbound record is marked as "unmatched."

As noted in FIG. 1A, the matching process is performed prior to importing any of the records received at step 102 into the data hub. Accordingly, only "clean" data is actually inserted into the data hub. This overcomes the problems associated with prior art techniques of determining duplicates after import.

In one set of embodiments, the matching process of step 106 may be applied to all of the records in the inbound batch. In another set of embodiments, the matching process may only be applied to one or more of the records in the inbound batch. For example, prior to the execution of step 106, a user may select a subset of the records received at step 102 to undergo the matching process.

In addition, one or more records may be automatically excluded from the matching process based on one or more predefined rules. For example, in one embodiment, any inbound record that has a cross reference attribute set (which cross references a particular record in the data hub) may be automatically excluded from the matching process because that inbound record will be matched based on its cross reference. In another embodiment, any inbound record that is marked as a "new" record (i.e., does not exist in the data hub) may be automatically excluded from the matching process because there will be no duplicate records in the data hub. These records that are excluded from the matching process may be automatically imported into the data hub (or marked as confirmed for import).

In some cases, the records stored in a data hub may correspond to items that have multiple revisions. For example, a product management data hub may store data for a product in development, and the data for that product may include several records, each representing a different revision of the product. In these cases, inbound records are generally matched against the latest revision stored in the hub.

If a match is executed for an entire inbound batch, the matching process may be run asynchronously as a concurrent request. For example, at the source system/batch level, a users may set whether to execute the matching process automatically upon data upload. If the option is set, a concurrent request may be launched to execute the matching process for all unconfirmed records in a given import batch.

Additionally, users may select a match rule and manually launch a concurrent request for a particular batch. In one embodiment, when the concurrent request is being executed, users cannot make changes to the batch. Further, only one matching concurrent request may be processed at a given time.

The status of the concurrent request may be refreshed in a user interface screen of a import workbench application (described in further detail below) to view updates from the matching process.

Once the matching process is complete, the processing of flowchart 100 can follow one of several different paths. In one embodiment, all of the records determined to be duplicates in step 106 may be imported into the data hub without any human intervention (step 108). This comprises merging the records with the matching records in the data hub. In another embodiment, all of the records determined to be duplicates in step 106 (as well as their matching records in the data hub) may be displayed to a user as a list of "unconfirmed" duplicates (step 110). The user may then perform one or more operations with respect to the list.

Figure 1B:
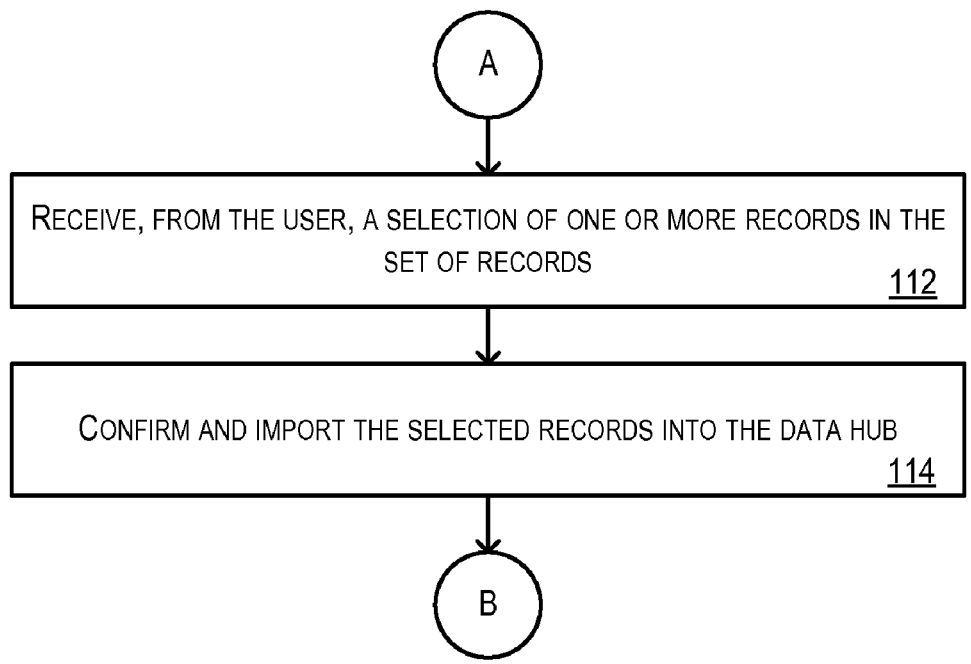

For example, as shown in FIG. 1B, the user may select one or more records in the unconfirmed duplicates list (step 112) and mark them as "confirmed" duplicates. These confirmed duplicates can then be merged with their matching records stored in the data hub and thereby imported (step 114).

Figure 1C:
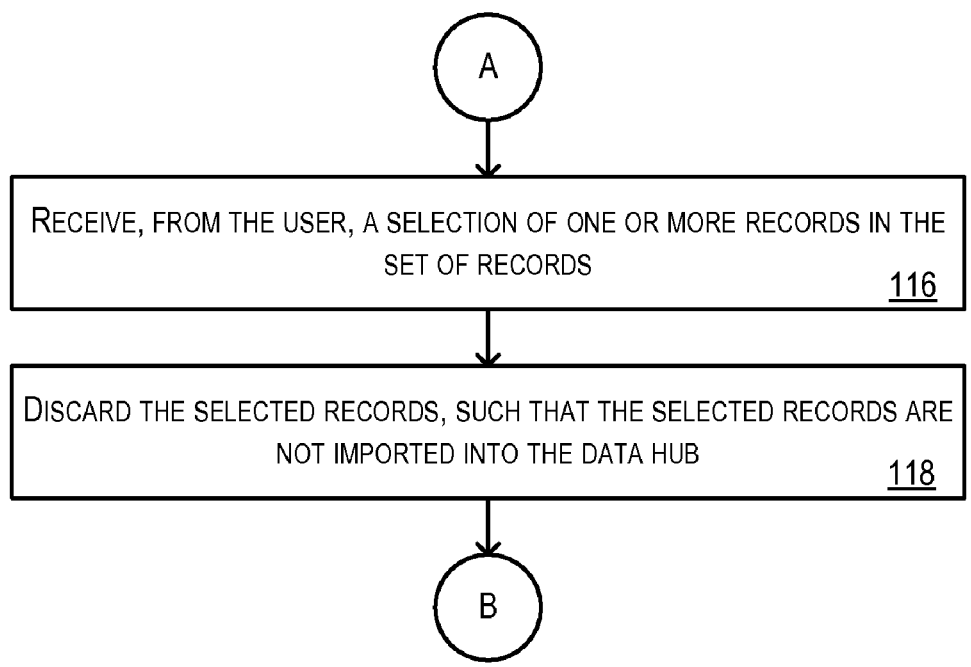

Alternatively, as shown in FIG. 1C, the user may select one or more records in the unconfirmed duplicates list (step 116) and discard the selected records so that they are not imported into the data hub (step 118).

Figure 1D:
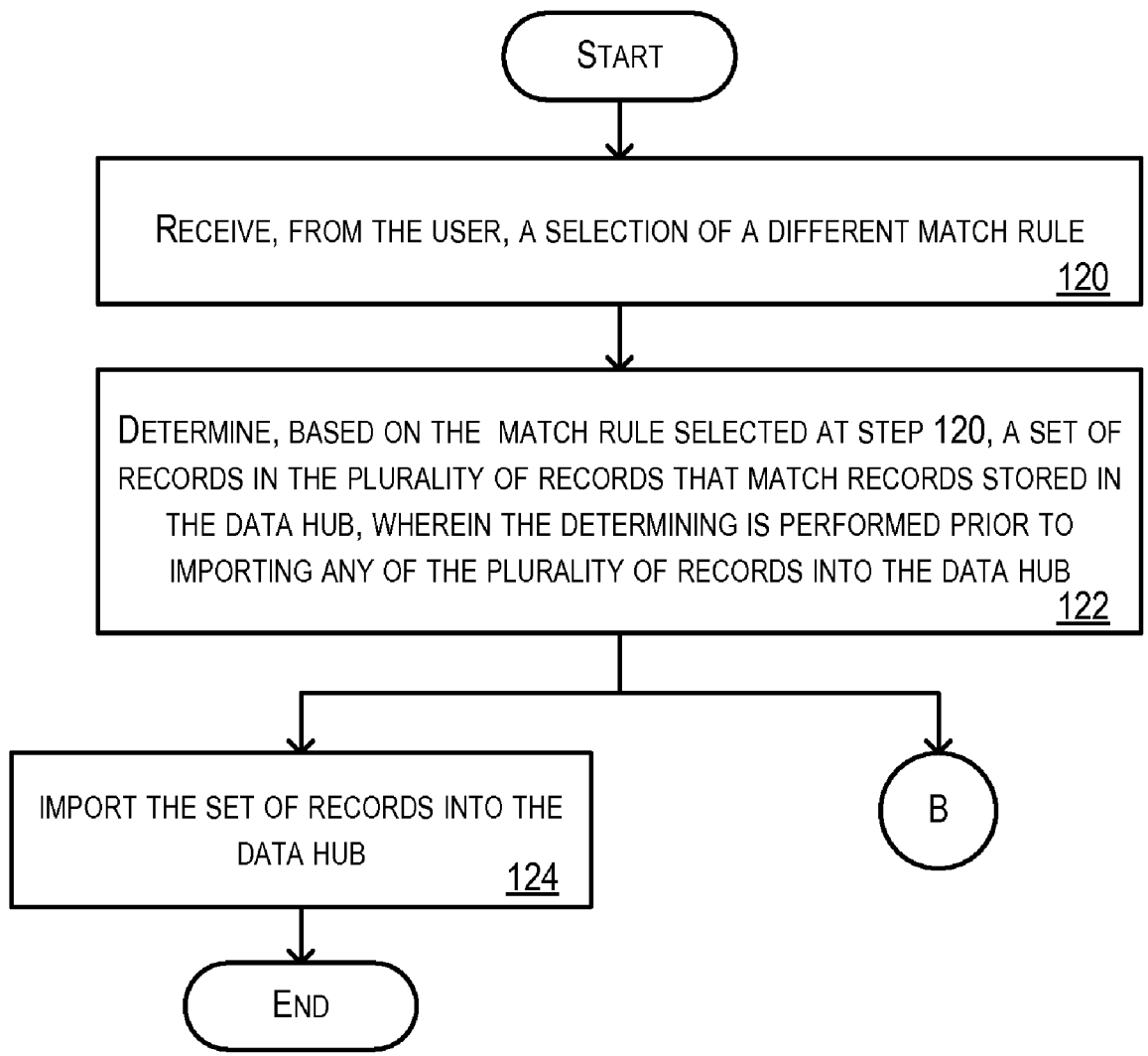

In another embodiment, the user may decide to re-run the matching process of step 106 using a different match rule. Thus, as shown in FIG. 1D, the user may select a new match rule (step 120), which is then used to determine another set of records (that may be the same or different from the set or records determined in step 106) that match, based on the new match rule, records stored in the data hub (step 122). Like step 106, this second matching process is performed prior to importing any of the inbound records into the data hub.

The records identified by this second matching process can be automatically imported into the data hub (step 124), or may be presented to the user again as a second list of unconfirmed duplicates. The user then has the same options described above for performing operations with respect to the records in the list. For example, the user may select one or more records in the list for import, may select one or more records in the list for delete, or may iteratively re-run the matching process using a different match rule. This process can be repeated any number of times until all of the records in the inbound batch are imported, deleted, or confirmed for import.

In one set of embodiments, a user may only view records in the unconfirmed duplicates list for records/items to which the user has access (e.g., via one or more security roles/privileges). This prevents users from matching to, and importing data for, items that they are not supposed to access.

It should be appreciated that the steps illustrated in FIGS. 1A-1D provide a particular method for identifying duplicate records in inbound data according to an embodiment of the present invention. Other sequences of steps may also be performed according to alternative embodiments. For example, alternative embodiments of the present invention may perform the steps outlined above in a different order. Moreover, the individual steps illustrated in FIGS. 1A-1D may include multiple sub-steps that may be performed in various sequences as appropriate to the individual step. Furthermore, additional steps may be added or removed depending on the particular application. One of ordinary skill in the art would recognize many variations, modifications, and alternatives.

Figure 2:
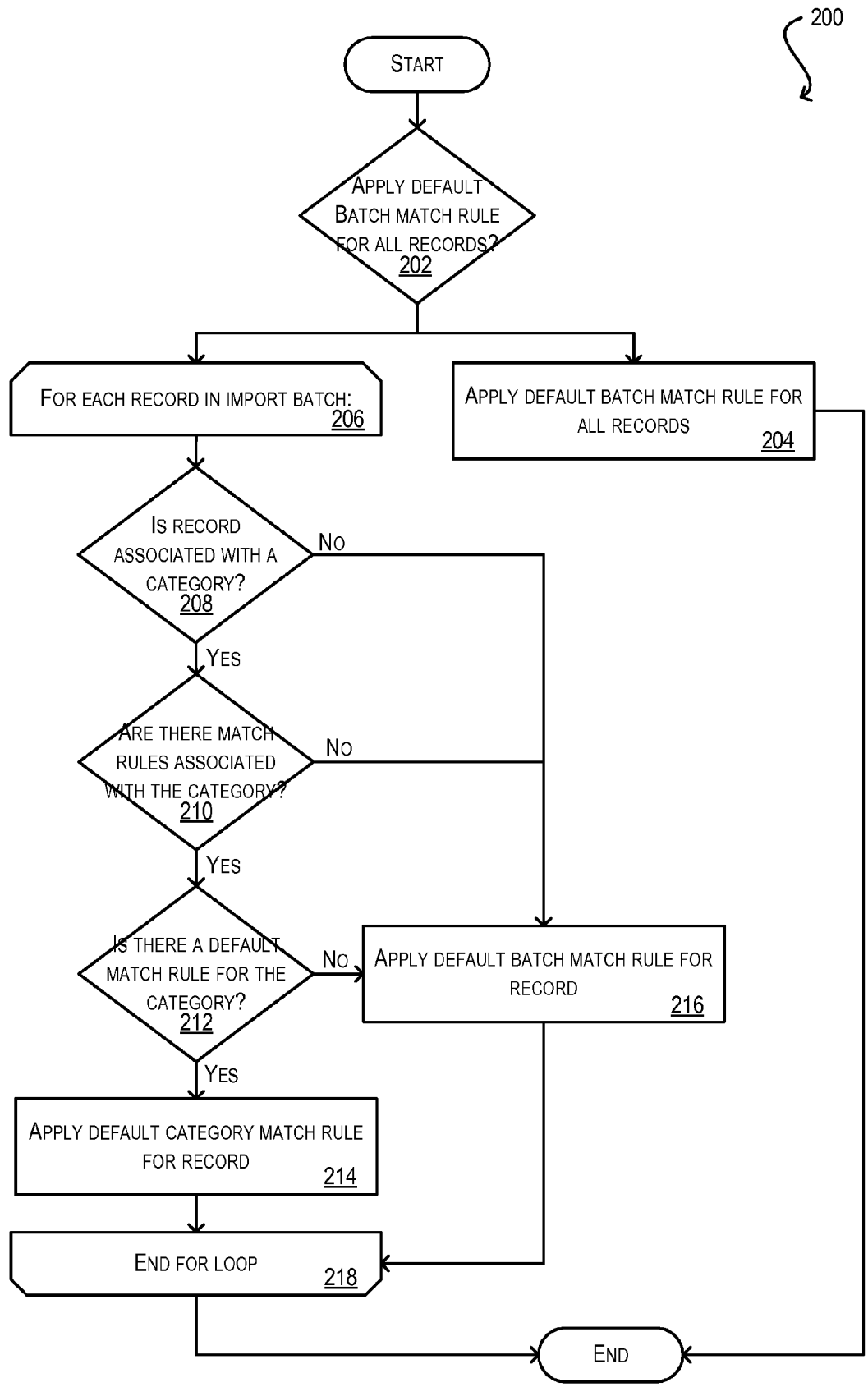
FIG. 2 is a flowchart illustrating steps performed in selecting a match rule in accordance with an embodiment of the present invention.

As discussed above, match rules may be defined at the source system level, batch level, or item category level. Accordingly, a set of precedence rules is needed to determine which match rule to apply to a particular inbound record during the matching process. FIG. 2 is a flowchart 200 illustrating one such set of precedence rules.

At step 202, a determination is made whether to apply a default batch match rule to all of the records in the inbound batch. In one embodiment, the default batch match rule is defaulted from the source system level. If the default batch match rule should be applied, it is applied to all of the records in the batch (step 204). If the default batch match rule should not be applied, each record in the batch is evaluated to determine an appropriate match rule (step 206).

For example, at step 208, a determination is made whether the record is associated with a category. If the record is not associated with a category, the default batch match rule is applied to the record (step 216). If the record is associated with a category, a determination is made whether there are any match rules for the category (step 210), and whether there is a default category match rule (step 212). If there is no default category match rule, the default batch match rule is applied to the record (step 216). If there is a default category match rule, that default category match rule is applied to the record (step 214). This process is iterated for every record in the inbound batch.

It should be appreciated that the steps illustrated in FIG. 2 provide a particular method for selecting match rule(s) for an inbound batch of records according to an embodiment of the present invention. Other sequences of steps may also be performed according to alternative embodiments. For example, alternative embodiments of the present invention may perform the steps outlined above in a different order. Moreover, the individual steps illustrated in FIG. 2 may include multiple sub-steps that may be performed in various sequences as appropriate to the individual step. Furthermore, additional steps may be added or removed depending on the particular application. One of ordinary skill in the art would recognize many variations, modifications, and alternatives.

Figure 3:
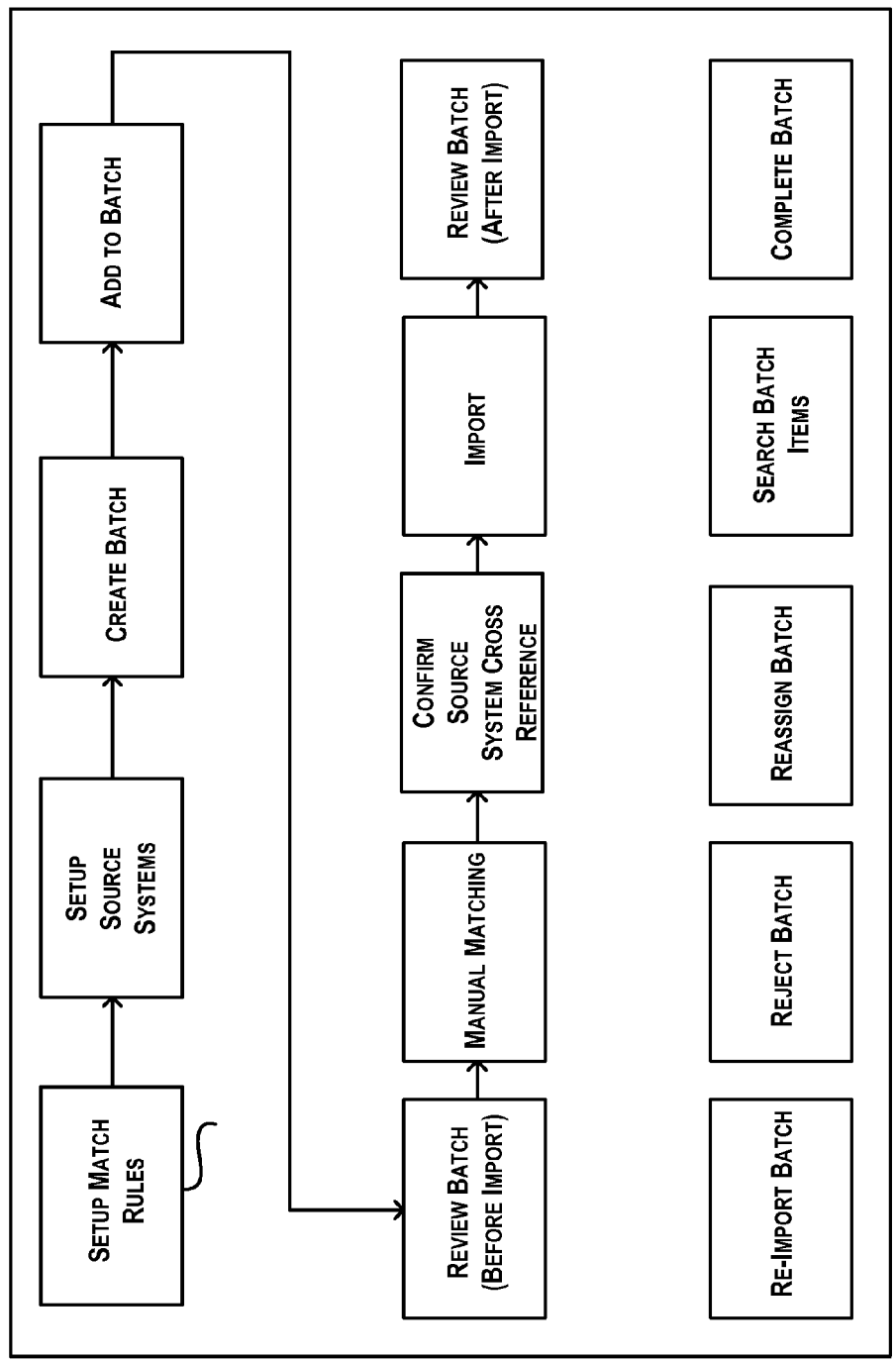
FIG. 3 is a block diagram illustrating functions supported by an import workbench application in accordance with an embodiment of the present invention.

In one set of embodiments, an import workbench application is provided that includes a plurality of user interface screens related to data hub administration and management. These user interface screens may include screens to set up appropriate metadata for enabling matching (e.g., match rules, source system setup, batch setup, etc.), screens for executing the matching process, screens for reviewing the results of the matching process, and screens for importing confirmed duplicates. FIG. 3 is a diagram 300 illustrating some of the functions supported by the import workbench application. In one embodiment, the import workbench application is a component of the destination data hub (i.e., the data hub into which the data is being imported). In another embodiment, the import workbench application is separate from, but in communication with, the data hub.

Figure 4:
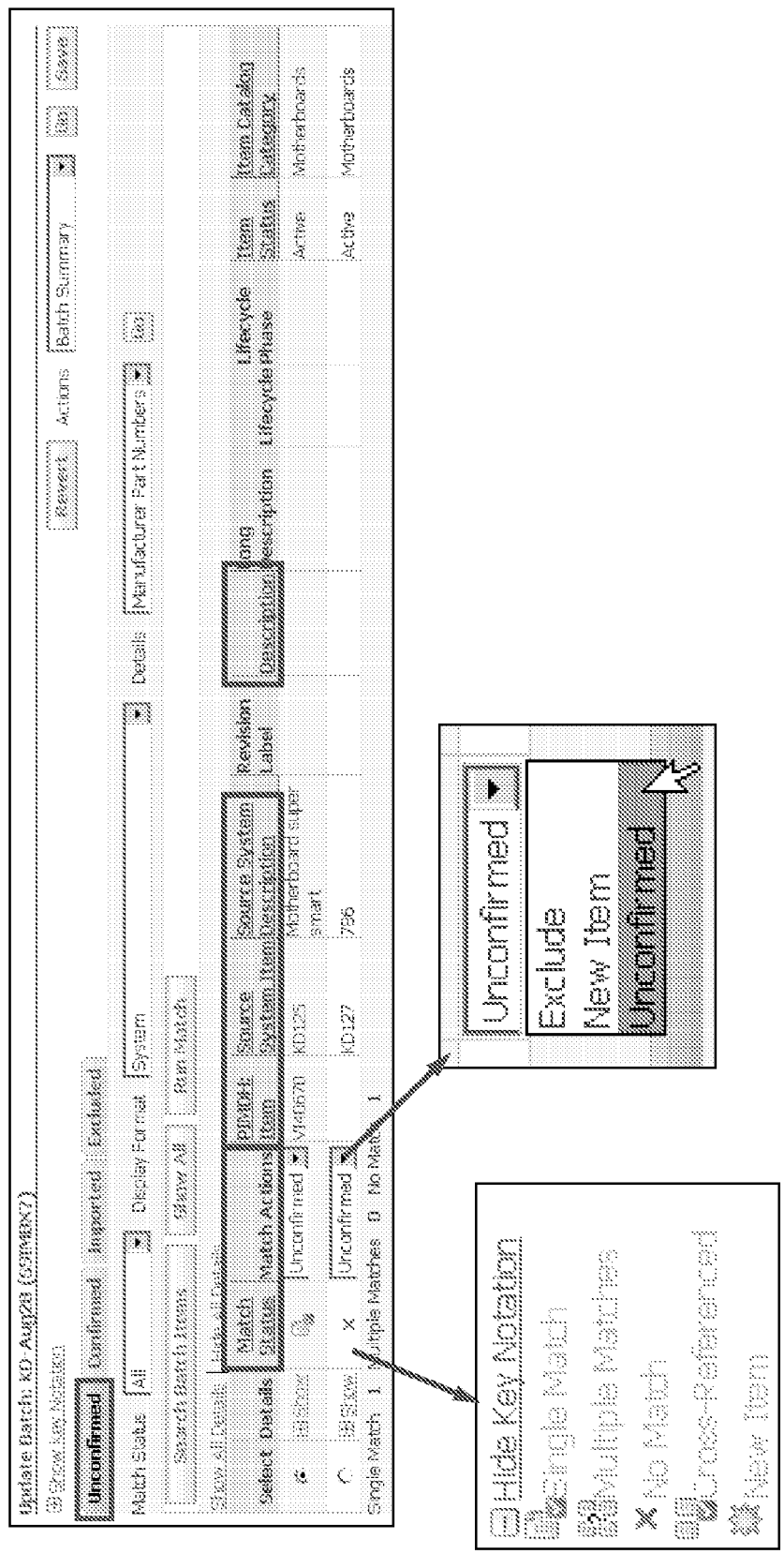

FIGS. 4-7 illustrate various user interface screens provided by the import workbench application. FIG. 4 is a user interface screen 400 that displays the unconfirmed records for a given import batch that have not yet been imported.

As shown in screen 400, unconfirmed items are assigned one of the following match statuses:

Single Match
    These are item records for which a single item match in the destination data hub was found.
Multiple Matches
    These are item records for which multiple item matches in the destination data hub were found.
No Match
    These are item records that are not cross-referenced, and for which no item matches in the destination data hub were found.

The following table describes the various columns of the unconfirmed items table shown in FIG. 4.

| Table Column Name | Type | Required | Sortable | LOV, additional information like validations |
|---|---|---|---|---|
| Match Status | Icon | | Yes | Match statuses are represented using Icons. Mouse roll over shows the match status description. |
| Match Actions | Droplist | | | Match action for single and multiple matches:<br>Unconfirmed (By default)<br>Confirm<br>New Item<br>Exclude<br>Match actions when there is No match<br>Unconfirmed (By default)<br>New Item<br>Exclude |
| PIMDH: Item | Char Field | | Yes | PIM Data hub Item which is being matched to and updated.<br>In case of single match it shows the item. In other cases like No Match and Multiple matches, it is kept blank. |

-continued

| Table Column Name | Type | Required | Sortable | LOV, additional information like validations |
|---|---|---|---|---|
| Source System Item | Char Field | | Yes | Source system item name which is being imported. |
| Additional source system columns will be displayed as per display format | | | | Source system Item description is also part of display format. |
| Description | Char Field | | Yes | Source system item description. Description will be part of the display format. |
| Search Batch Items | | | | Navigates to the simple search screen that includes search by Item Item Description Item Catalog Category. |
| Show All | | | | Reset the master table and shows all the Unconfirmed Items. |
| Run Match | | | | Navigates user to the Run Match page where user can select match rules that can be executed. |

Figure 5A:
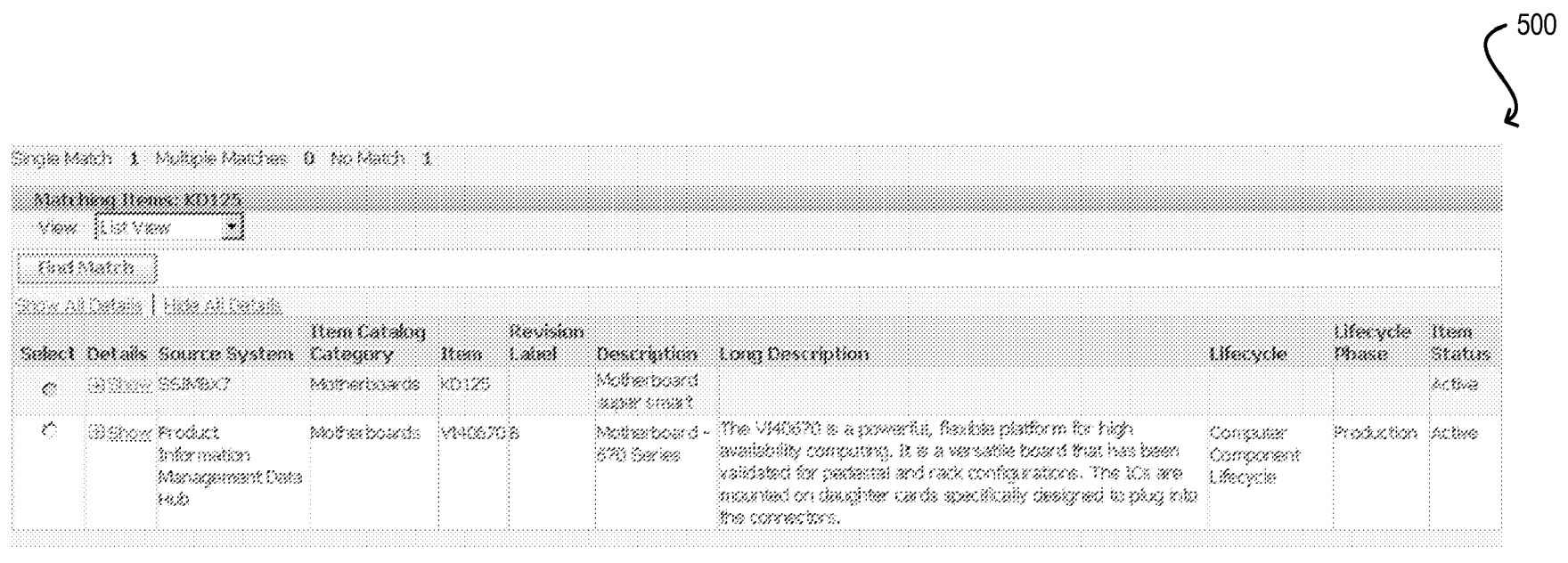

FIG. 5A is a user interface screen 500 that presents a detailed view of the matching records in the destination data hub for a given inbound record. In one set of embodiments, users may toggle between a "List" view and a "Compare" view of the data via the "View" drop down list. Screen 500 represents an example of the "List" view. As shown, the first row corresponds to the inbound record, and the remaining rows correspond to the matching records stored in the data hub.

The following table describes the various columns of the unconfirmed items table shown in FIG. 5A.

| Table Column Name | Type | Required | Sortable | LOV, additional information like validations |
|---|---|---|---|---|
| Select | Radio Button | | | User can select the appropriate matching item by selecting the radio button. In order to confirm this match, User will have to select the "Confirm" match actions for the corresponding row in the master table. Upon selection the master table is updated with the PIMDH Item. User will have to select confirm to confirm the match. |
| Source System | | | | $1^{st}$ row shows the Source System name and the source system item that is being imported. Rest of the rows shows the matching Product Data Hub Items. |
| Item | Char Field | | Yes | Source system item name appears in the first row, followed by matching Product Data hub items. |
| Additional columns are displayed as the master table display format | | | | |
| Find Match | Action | | | This button takes User to the search and find match page. The initial matching criteria are already displayed in search and find match page. |

Figure 5B:
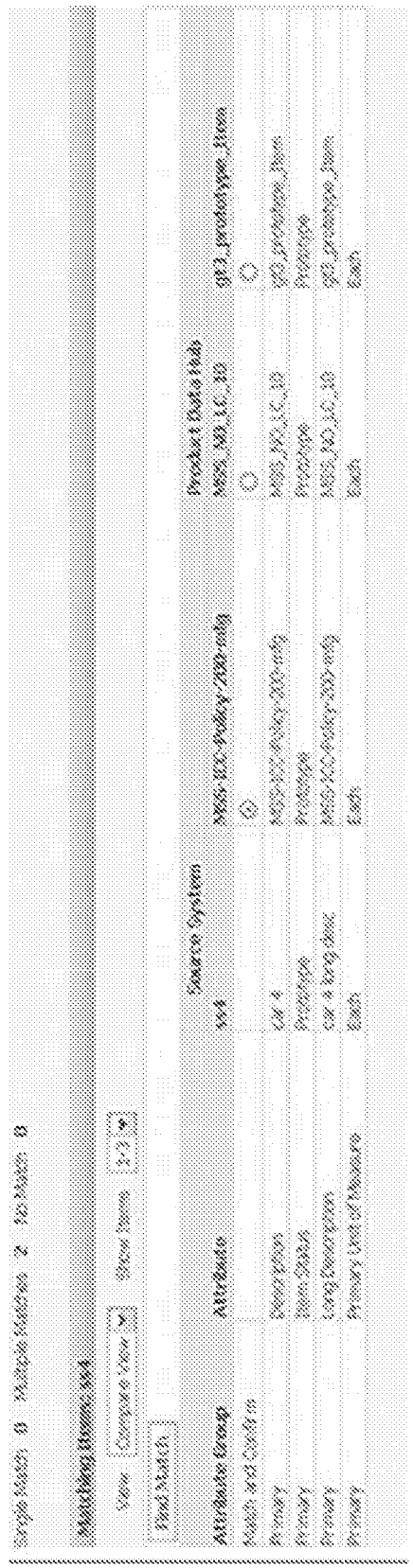

FIG. 5B is a user interface screen 550 of the "Compare" view. The "Compare" view is configured to display each attribute of the inbound record and matching data hub records in a separate row. The following table describes the various columns that may appear in this view.

| Table Column Name | Type | Required | Sortable | LOV, additional information like validations |
|---|---|---|---|---|
| Attribute Group | | | | Source System item attribute group that are being imported. |
| Attributes | Char Field | | | Source system item attributes that are being imported as part of the batch. |
| Source System Item | Char Field | | Yes | Source system item name which is being matched and imported. |
| Product Data hub Items | Char Field | | Yes | Four matching product data hub items are shown by default for comparison. |
| Find Match | Action | | | This button takes User to the search and find match page. The initial matching criteria are already displayed in search and find match page. |

In one set of embodiments, users may use the "Find Match" action displayed in user interface screen 500 to execute a new match on a particular inbound record. The "Find Match" action navigates to a separate "Find Match" user interface screen that displays, by default, the match rule criteria defined for the batch. The user may make changes to the defaulted match rule criteria and re-execute the matching process. In an exemplary embodiment, the changes to the defaulted match rule criteria are cached until the user navigates to the context of a different record.

The portion of the "Find Match" user interface screen that displays the match rule criteria is similar to the "Create Match Rules" user interface screen that is described below. This portion may include the following columns:

| Table Column Name | Type | Required | Sortable | LOV, additional information like validations |
|---|---|---|---|---|
| Attribute Group | Char Field | | No | Source system item attribute group that are being imported as part of the batch. |
| Attribute | Char Field | | No | Source system item attribute group that are being imported as part of the batch. |
| Search | Droplist | | No | Values are "Keyword" and "Exact". This droplist is only available for Item Number, Item description, long description, Item Catalog Category, Manufacturer and Manufacturer's Part Number. Upon selecting Keyword these attributes, system will peform a PPR and checkboxes in the remaining columns "Keyword Match Condition" and "Additional Match Operators" appear. For attributes not using the Oracle Text Index, the following operators can be used: Character Attributes - Is (Exact) Numeric Attributes - Is (Exact) Date Attributes - Is (Exact) For Exact search, these operators are hidden. Exception: For rest of the Item attributes system can only perform "Exact" search. |
| Keyword Match Condition | Droplist | | No | Values are "All" and "Any". |
| Additional Match Operators: Fuzzy | Checkbox | | | If checkbox is selected/checked system will perform Fuzzy search. |
| Additional Match | Checkbox | | | If checkbox is selected/checked system |

-continued

| Table Column Name | Type | Required | Sortable | LOV, additional information like validations |
|---|---|---|---|---|
| Operators: Stemming Additional Match Operators: Synonyms | Checkbox | | | will perform Stemming search. If checkbox is selected/checked system will perform Synonyms search. |
| Action: Remove | Button | | | Removes the criteria |
| Action: Add Criteria | | | | User is taken to the add criteria page where user can add additional attributes to the criteria and user navigates back to this page. |

In various embodiments, re-executing the matching process from the "Find Match" screen will result in the display of a "Matches" table indicating all of the matches found. In one embodiment, the "Matches" table will only display records from the destination data hub for which the current user has view access and update/edit source system cross-reference privilege.

In one set of embodiments, users may use the "Run Match" action displayed on user interface screen 400 to execute a new match on an entire import batch. The "Run Match" action navigates to a separate "Run Match" user interface screen in which the user can select a new match rule for the batch. The selected match rule may then be run against the batch. Users may also run a default category match rule for those records that have a category defined.

Figure 6:
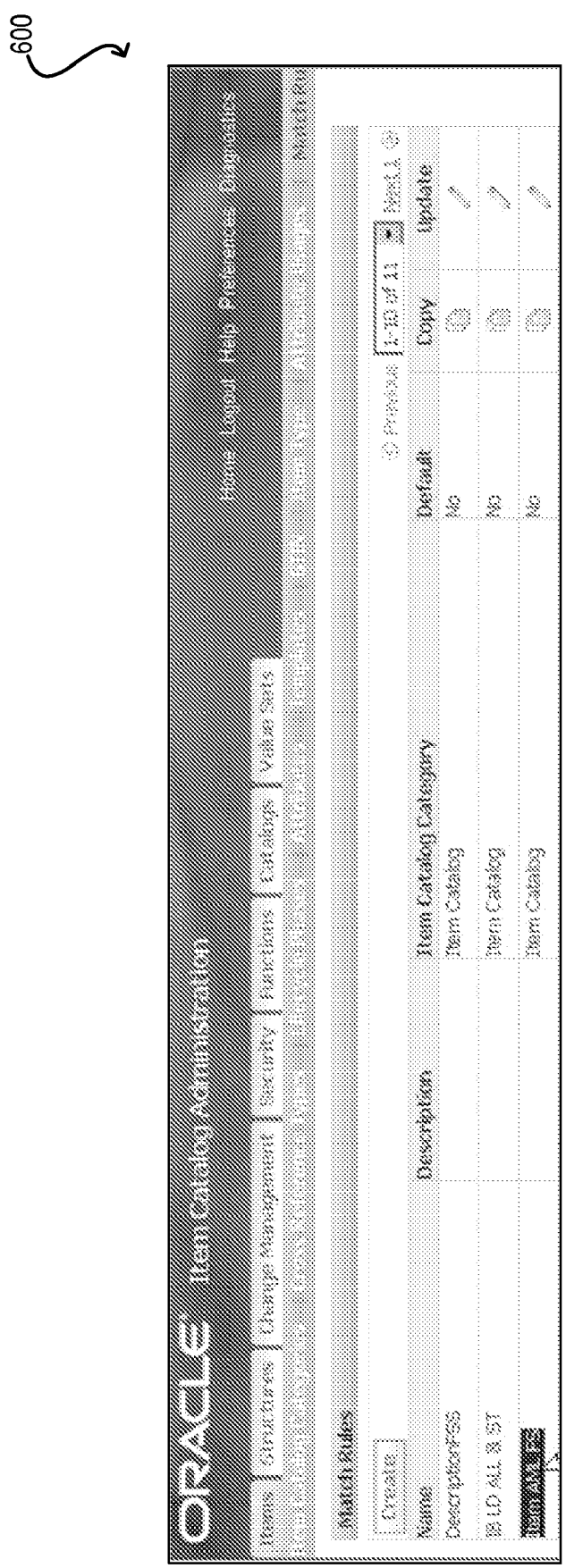

FIG. 6 is a user interface screen 600 illustrating a Match Rules list page. This page may be used to view and access the various match rules defined in the system. In various embodiments, a match rule may be defined for a root category (i.e., no category) or a child category in a category hierarchy. Thus, user interface screen 600 may be configured to display all of the match rules regardless of category, or only the match rules for a specific category. From this screen, users can select one match rule in the list to be the default match rule for a category.

The following table describes the various columns of the "Match Rules" table shown in FIG. 6.

Figure 7:
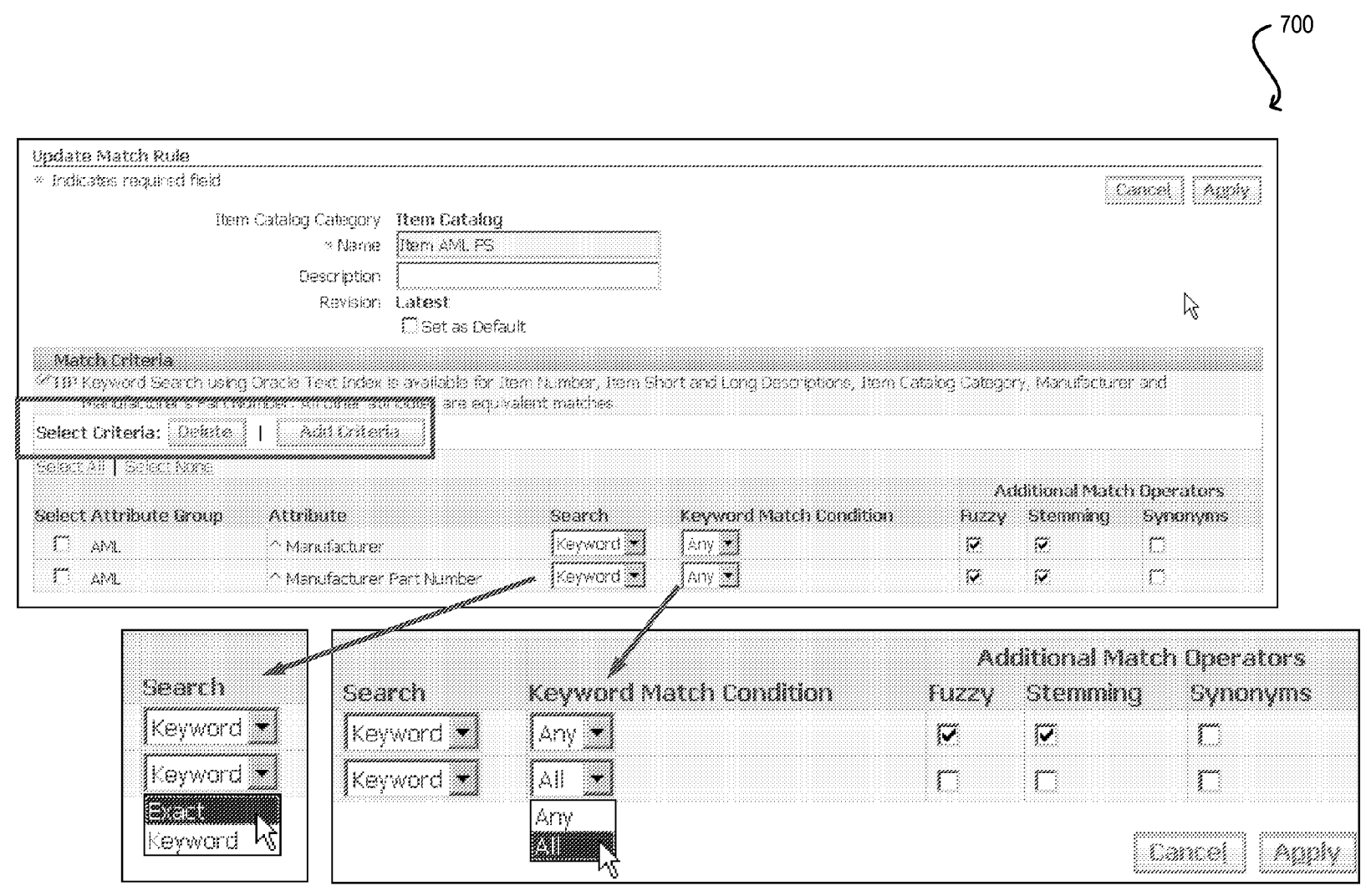

From the Match Rules list of FIG. 6, users may update an existing match rule or create a new match rule. FIG. 7 is a user interface screen 700 illustrating the Create/Update Match Rule page. As shown, screen 700 includes fields for entering match rule attributes such as category, name, and description. Screen 700 also includes a match criteria section for adding or updating match criteria for the match rule. Although only two match criteria are shown for the match rule of FIG. 7, any number of match criteria per match rule are supported.

In the match criteria section, users may, for example, select an attribute among all of the attributes defined for the corresponding category. For each attribute, users may specify parameters for how the attribute will be matched. For example, the attribute can be matched as an exact match, or as a "keyword" match. In the case of a keyword match, the match can be performed using fuzzy, stemming, or synonym logic. Fuzzy logic performs matching based on an established knowledge base that contains associations between words. Stemming logic performs matching based on word stems. Synonym logic performs matching based on known synonyms. These types of keyword matching are particularly useful for certain attributes that contain free form text, such as a description attribute.

The following table describes the various columns of the "Match Criteria" table shown in FIG. 7.

| Table Column Name | Type | Required | Sortable | LOV, additional information like validations |
|---|---|---|---|---|
| Name | Char | | | Match Rule Name |
| Description | Char | | | Match Rule Description |
| Item Catalog Category | | | | |
| Default | | | | Indicates the default match rule. |
| Copy | Icon | | | Copies the selected match rule and navigates the User to the Create Match Rule page. Match rule criteria are pre-populated from the copied match rule. |
| Update | Icon | | | Navigates User to update match rule page. |
| Create | Button Action. | | | |

| Table Column Names | Type | Required | LOV, additional information like validations |
| --- | --- | --- | --- |
| Attribute Group | | | Displays Attribute Group Name |
| Attribute | Char | | Displays Attribute Name |
| Search | Char or Droplist | | Droplist values are<br>Keyword<br>Exact<br>This droplist options is only applicable to the fields that support Oracle Text Index. These are Item, Item Description, Item Catalog Category, Manufacturer and Manufacturer's Part Number. For all the attributes except the ones mentioned above, it will show "Exact" in read-only mode. |
| Keyword Match Condition | Blank or Droplist | | Droplist values are<br>All (Search for Items having all values as matching).<br>Any (Search for Items that has any one of the value as matching).<br>These droplist options are only shown if you have selected "Keyword" in the Search column.<br>In other cases it will be kept blank. |
| Additional Match Operators | Blank or checkbox | | This column uses column span and includes Fuzzy, Stemming and Synonyms as sub-columns. Each of these has checkboxes for selection. Checkbox are only display if you have selected "Keyword" in the Search column.<br>In other cases it will be kept blank. |

Figure 8:
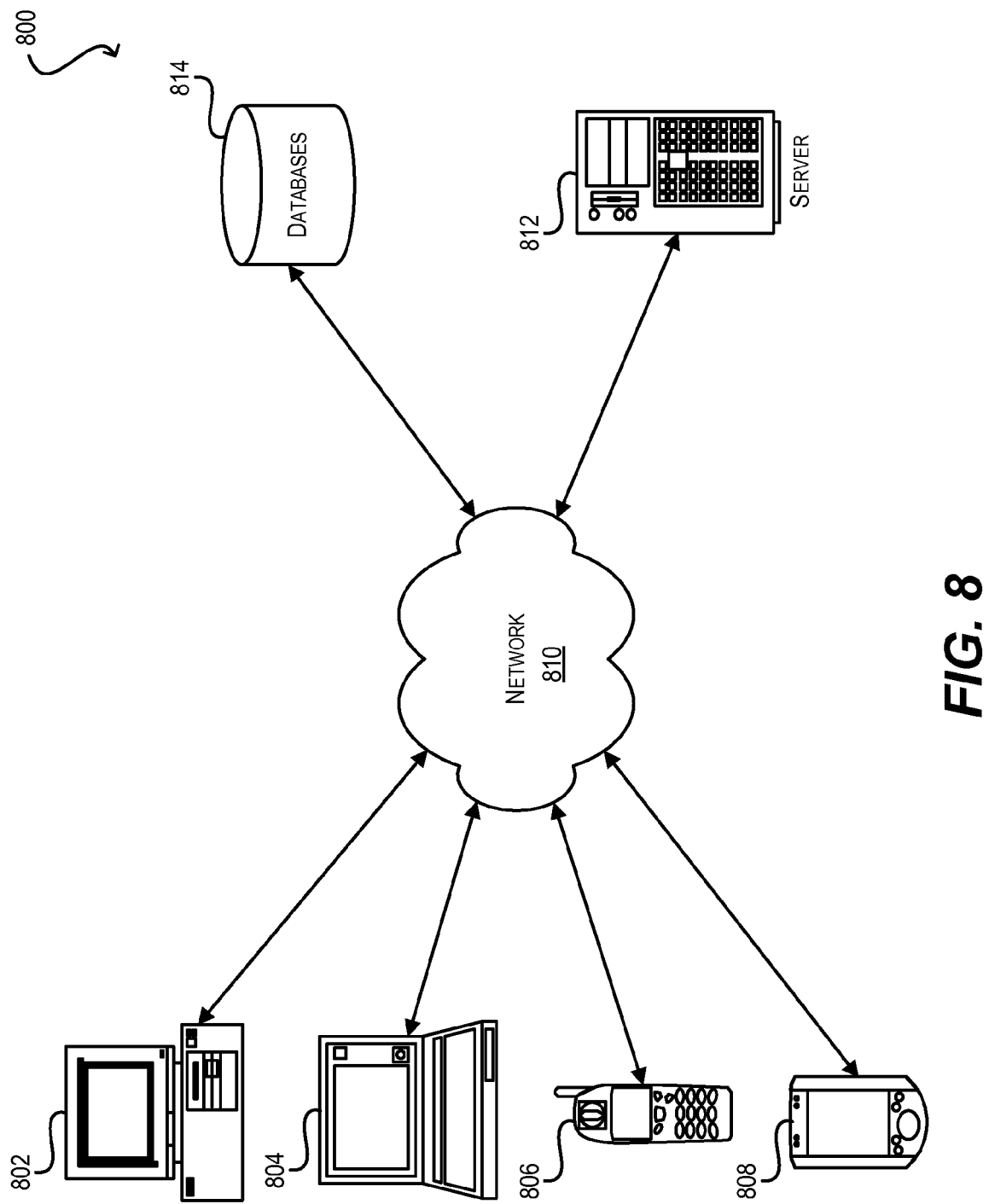
FIG. 8 is a simplified block diagram of a system environment that may incorporate an embodiment of the present invention.

FIG. 8 is a simplified block diagram illustrating components of a system environment 800 that may be used in accordance with an embodiment of the present invention. As shown, system environment 800 includes one or more client computing devices 802, 804, 806, 808, which are configured to operate a client application such as a web browser, proprietary client (e.g., Oracle Forms), or the like. In one set of embodiments, client computing devices 802, 804, 806, 808 are used to access the import workbench application described herein and to display the user interface screens of FIGS. 4-7.

Client computing devices 802, 804, 806, 808 may be general purpose personal computers (including, by way of example, personal computers and/or laptop computers running various versions of Microsoft Windows and/or Apple Macintosh operating systems), cell phones or PDAs (running software such as Microsoft Windows Mobile and being Internet, e-mail, SMS, Blackberry, or other communication protocol enabled), and/or workstation computers running any of a variety of commercially-available UNIX or UNIX-like operating systems (including without limitation the variety of GNU/Linux operating systems). Alternatively, client computing devices 802, 804, 806, 808 may be any other electronic device, such as a thin-client computer, Internet-enabled gaming system, and/or personal messaging device, capable of communicating over a network (e.g., network 810 described below). Although exemplary system environment 800 is shown with four client computing devices, any number of client computing devices may be supported.

System environment 800 also includes one or more server computers 812 which may be general purpose computers, specialized server computers (including, by way of example, PC servers, UNIX servers, mid-range servers, mainframe computers, rack-mounted servers, etc.), server farms, server clusters, or any other appropriate arrangement and/or combination. In various embodiments, server 812 may be adapted to run one or more services or software applications described in the foregoing disclosure. For example, server 812 may be adapted to run an import workbench application as described with respect to FIGS. 3-7.

Server 812 may run an operating system including any of those discussed above, as well as any commercially available server operating system. Server 812 may also run any of a variety of additional server applications and/or mid-tier applications, including HTTP servers, FTP servers, CGI servers, Java servers, database servers, and the like. Exemplary database servers include without limitation those commercially available from Oracle, Microsoft, Sybase, IBM and the like.

In various embodiments, clients 802, 804, 806, 808 and server 812 are communicatively coupled via network 810. Network 810 may be any type of network familiar to those skilled in the art that can support data communications using any of a variety of commercially-available protocols, including without limitation TCP/IP, SNA, IPX, AppleTalk, and the like. Merely by way of example, network 810 can be a local area network (LAN), such as an Ethernet network, a Token-Ring network and/or the like; a wide-area network; a virtual network, including without limitation a virtual private network (VPN); the Internet; an intranet; an extranet; a public switched telephone network (PSTN); an infra-red network; a wireless network (e.g., a network operating under any of the IEEE 802.11 suite of protocols, the Bluetooth protocol known in the art, and/or any other wireless protocol); and/or any combination of these and/or other networks.

System environment 800 may also include one or more databases 814. In one set of embodiments, database 814 is configured to store data and metadata (e.g., match rules, source system setup, etc.) for managing a data hub in accordance with the foregoing disclosure. Database 814 may reside in a variety of locations. By way of example, database 814 may reside on a storage medium local to (and/or resident in) server 812. Alternatively, database 814 may be remote from server 812, and in communication with server 812 via a network-based or dedicated connection. In one set of embodiments, database 814 may reside in a storage-area network (SAN) familiar to those skilled in the art. Similarly, any necessary files for performing the functions attributed to server 812 may be stored locally on server 812 and/or remotely, as appropriate. In one set of embodiments, database 814 may include relational databases, such as Oracle 10g, that are adapted to store, update, and retrieve data in response to SQL-formatted commands.

Figure 9:
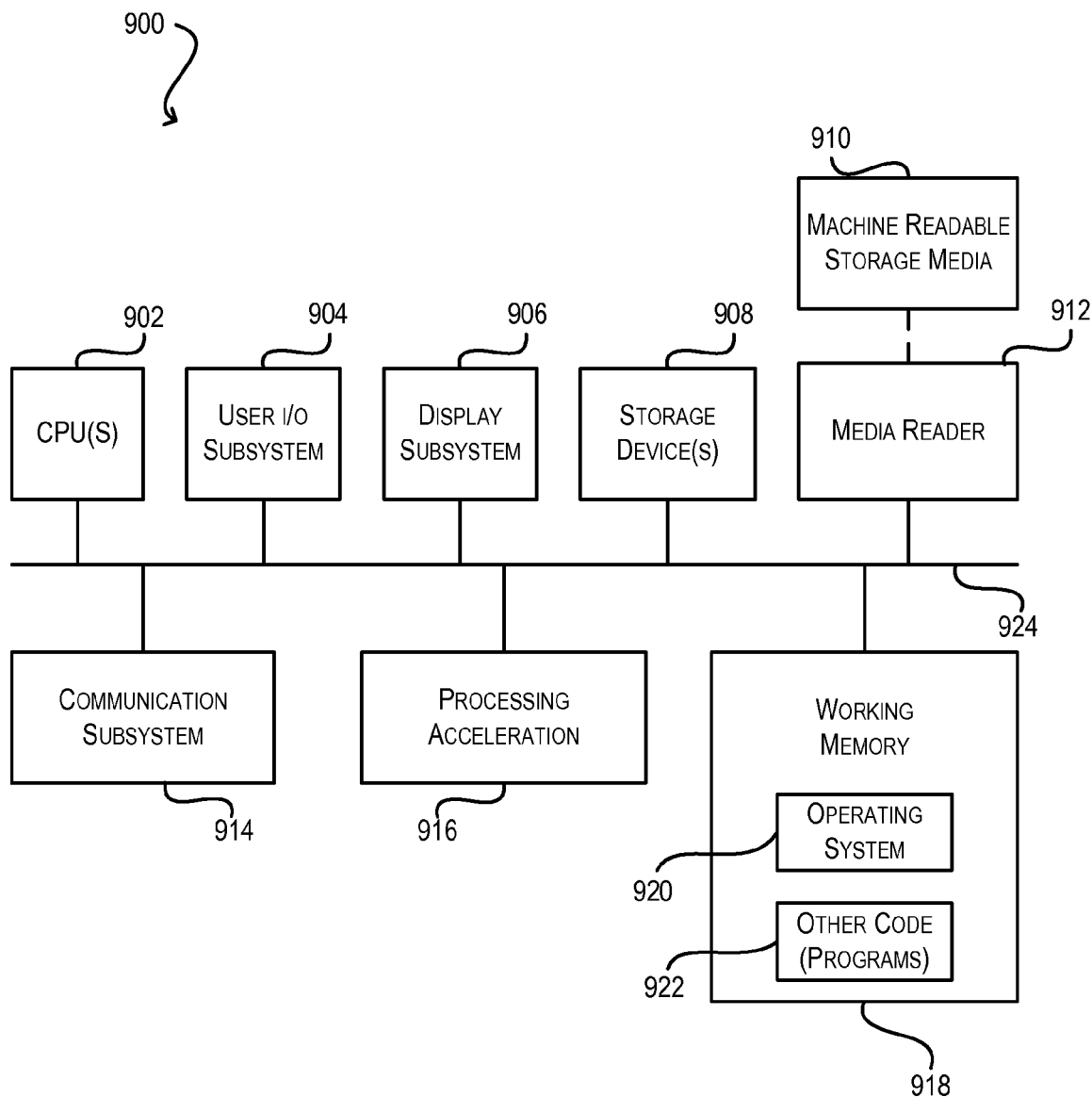
FIG. 9 is a simplified block diagram of a computer system that may incorporate an embodiment of the present invention.

FIG. 9 is a simplified block diagram of a computer system 900 that may be used in accordance with embodiments of the present invention. For example clients 802, 804, 806, 808 and server 812 may be implemented using a system such as system 900. Computer system 900 is shown comprising hardware elements that may be electrically coupled via a bus 924. The hardware elements may include one or more central processing units (CPUs) 902, one or more input devices 904 (e.g., a mouse, a keyboard, etc.), and one or more output devices 906 (e.g., a display device, a printer, etc.). Computer system 900 may also include one or more storage devices 908. By way of example, the storage device(s) 908 may include devices such as disk drives, optical storage devices, and solid-state storage devices such as a random access memory (RAM) and/or a read-only memory (ROM), which can be programmable, flash-updateable and/or the like.

Computer system 900 may additionally include a computer-readable storage media reader 912, a communications subsystem 914 (e.g., a modem, a network card (wireless or wired), an infra-red communication device, etc.), and working memory 918, which may include RAM and ROM devices as described above. In some embodiments, computer system 900 may also include a processing acceleration unit 916, which can include a digital signal processor (DSP), a special-purpose processor, and/or the like.

Computer-readable storage media reader 912 can further be connected to a computer-readable storage medium 910, together (and, optionally, in combination with storage device(s) 908) comprehensively representing remote, local, fixed, and/or removable storage devices plus storage media for temporarily and/or more permanently containing computer-readable information. Communications system 914 may permit data to be exchanged with network 810 and/or any other computer described above with respect to system environment 800.

Computer system 900 may also comprise software elements, shown as being currently located within working memory 918, including an operating system 920 and/or other code 922, such as an application program (which may be a client application, Web browser, mid-tier application, RDBMS, etc.). In an exemplary embodiment, working memory 918 may include executable code and associated data structures for executing the techniques described herein. It should be appreciated that alternative embodiments of computer system 900 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by a computer.

Although specific embodiments of the invention have been described, various modifications, alterations, alternative constructions, and equivalents are also encompassed within the scope of the invention. Embodiments of the present invention are not restricted to operation within certain domain or context, but are free to operate within a plurality of domains or contexts. For example, embodiments of the present invention may be used to identify duplicate records in data to be imported into a data repository or source other than a data hub. Additionally, although embodiments of the present invention have been described using a particular series of transactions and steps, it should be apparent to those skilled in the art that the scope of the present invention is not limited to the described series of transactions and steps.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims.

What is claimed is:

1. A method for identifying duplicate records in inbound data, the method comprising:

receiving, by a computer system, data originating from a source system, the data including a plurality of records to be imported from the source system into a data hub;

selecting, by the computer system, a first match rule comprising a first set of match criteria, the first set of match criteria identifying one or more attributes of the plurality of records and one or more match operators for matching the plurality of records with records stored in the data hub; and determining, by the computer system based on the first match rule, a first set of records in the plurality of records that match records stored in the data hub, wherein the determining is performed prior to importing any of the plurality of records into the data hub.

2. The method of claim 1 further comprising:

presenting the first set of records to a user;

receiving, from the user, a selection of at least one record in the first set of records; and importing said at least one record into the data hub, wherein the importing comprises merging said at least one record with a matching record stored in the data hub.

3. The method of claim 1 further comprising:

presenting the first set of records to a user;

receiving, from the user, a selection of at least one record in the first set of records; and discarding said at least one record, such that the at least one record is not imported into the data hub.

4. The method of claim 1 further comprising:

automatically importing the first set of records into the data hub, wherein the automatic importing comprises merging the first set of records with matching records stored in the data hub.

5. The method of claim 1 further comprising:
presenting the first set of records to a user;
receiving, from the user, a selection of a second match rule comprising a second set of match criteria, the second set of match criteria being distinct from the first set of match criteria; and
determining, based on the second match rule, a second set of records in the plurality of records that match records stored in the data hub, wherein the determining is performed prior to importing any of the plurality of records into the data hub.

6. The method of claim 5 further comprising:
presenting the second set of records to the user;
receiving, from the user, a selection of at least one record in the second set of records; and
importing said at least one record into the data hub, wherein the importing comprises merging said at least one record with a matching record stored in the data hub.

7. The method of claim 5 further comprising:
presenting the second set of records to a user;
receiving, from the user, a selection of at least one record in the second set of records; and
discarding said at least one record, such that the at least one record is not imported into the data hub.

8. The method of claim 5 further comprising:
automatically importing the second set of records into the data hub, wherein the automatic importing comprises merging the second set of records with matching records stored in the data hub.

9. The method of claim 1, wherein the first match rule is selected based on the plurality of records, the source system, or a category associated with the plurality of records.

10. The method of claim 1, wherein the one or more attributes of the plurality of records are user-defined attributes.

11. The method of claim 1, wherein the one or more match operators include a fuzzy match operator, a stemming match operator, and a synonym match operator.

12. The method of claim 1, wherein the determining is performed as a concurrent request process.

13. A method for identifying duplicate records in inbound data, the method comprising:
receiving, by a computer system, data originating from a source system, the data including a plurality of records to be imported from the source system into a data hub; and
for each record in the plurality of records:
selecting, by the computer system, a match rule comprising a set of match criteria, wherein the match rule is selected based on a category associated with the record, and wherein the set of match criteria identifies one or more attributes of the record and one or more match operators for matching the record with records stored in the data hub; and
determining, by the computer system based on the match rule, whether the record matches any records stored in the data hub,
wherein the determining is performed for each record in the plurality of records prior to importing any of the plurality of records into the data hub.

14. A system for identifying duplicate records in inbound data, the system comprising:
a data repository configured to store a plurality of match rules; and
a server communicatively coupled with the data repository, the server being configured to:
receive data originating from a source system, the data including a plurality of records to be imported from the source system into a data hub;
select a first match rule comprising a first set of match criteria, the first set of match criteria identifying one or more attributes of the plurality of records and one or more match operators for matching the plurality of records with records stored in the data hub; and
determine, based on the first match rule, a first set of records in the plurality of records that match records stored in the data hub, wherein the determining is performed prior to importing any of the plurality of records into the data hub.

15. The system of claim 14, wherein the server is further configured to:
generate a user interface presenting the first set of records to a user;
receive, from the user, a selection of at least one record in the first set of records; and
import said at least one record into the data hub, wherein the importing comprises merging said at least one record with a matching record stored in the data hub.

16. The system of claim 14, wherein the server is further configured to:
automatically import the first set of records into the data hub, wherein the automatic importing comprises merging the first set of records with matching records stored in the data hub.

17. The system of claim 14, wherein the server is further configured to:
generate a user interface presenting the first set of records to a user;
receive, from the user, a selection of a second match rule comprising a second set of match criteria, the second set of match criteria being distinct from the first set of match criteria; and
determine, based on the second match rule, a second set of records in the plurality of records that match records stored in the data hub, wherein the determining is performed prior to importing any of the plurality of records into the data hub.

18. The system of claim 14, wherein the server is further configured to generate a user interface screen for defining the plurality of match rules.

19. The system of claim 18, wherein the user interface screen includes one or more user interface components for defining match criteria for a match rule.

20. The system of claim 18, wherein the user interface screen further includes one or more user interface components for defining attributes for a match rule.

21. A non-transitory machine-readable medium for a computer system, the machine-readable medium having stored thereon program code for identifying duplicate records in inbound data, the program code comprising:
code for receiving data originating from a source system, the data including a plurality of records to be imported from the source system into a data hub;
code for selecting a first match rule comprising a first set of match criteria, the first set of match criteria identifying one or more attributes of the plurality of records and one or more match operators for matching the plurality of records with records stored in the data hub; and
code for determining, based on the first match rule, a first set of records in the plurality of records that match records stored in the data hub, wherein the determining is performed prior to importing any of the plurality of records into the data hub.

22. The non-transitory machine-readable medium of claim 21, wherein the program code further comprises:
   code for presenting the first set of records to a user;
   code for receiving, from the user, a selection of at least one record in the first set of records; and
   code for importing said at least one record into the data hub, wherein the importing comprises merging said at least one record with a matching record stored in the data hub.

23. The non-transitory machine-readable medium of claim 21, wherein the program code further comprises:
   code for automatically importing the first set of records into the data hub, wherein the automatic importing comprises merging the first set of records with matching records stored in the data hub.

24. The non-transitory machine-readable medium of claim 21, wherein the program code further comprises:
   code for presenting the first set of records to a user;
   code for receiving, from the user, a selection of a second match rule comprising a second set of match criteria, the second set of match criteria being distinct from the first set of match criteria; and
   code for determining, based on the second match rule, a second set of records in the plurality of records that match records stored in the data hub, wherein the determining is performed prior to importing any of the plurality of records into the data.

* * * * *

UNITED STATES PATENT AND TRADEMARK OFFICE
CERTIFICATE OF CORRECTION

PATENT NO.        : 8,078,651 B2  
APPLICATION NO.   : 12/257269  
DATED             : December 13, 2011  
INVENTOR(S)       : Desai et al.

Page 1 of 1

It is certified that error appears in the above-identified patent and that said Letters Patent is hereby corrected as shown below:

In column 1, line 55, delete "expost" and insert -- ex post --, therefor.

In column 13-14, line 14, delete "peform" and insert -- perform --, therefor.

Signed and Sealed this
Sixth Day of March, 2012

David J. Kappos
*Director of the United States Patent and Trademark Office*